(12) United States Patent
Stuby, Jr.

(10) Patent No.: US 10,624,179 B2
(45) Date of Patent: Apr. 14, 2020

(54) LOCAL LUMINAIRE AREA CONTROL SYSTEM

(71) Applicant: TE CONNECTIVITY CORPORATION, Berwyn, PA (US)

(72) Inventor: Richard George Stuby, Jr., New Tripoli, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 16/266,256

(22) Filed: Feb. 4, 2019

(65) Prior Publication Data

US 2019/0350070 A1    Nov. 14, 2019

Related U.S. Application Data

(60) Provisional application No. 62/670,089, filed on May 11, 2018.

(51) Int. Cl.
*H05B 37/02* (2006.01)

(52) U.S. Cl.
CPC ..... *H05B 37/0272* (2013.01); *H05B 37/0218* (2013.01)

(58) Field of Classification Search
None
See application file for complete search history.

(56) References Cited

U.S. PATENT DOCUMENTS

| 2012/0286676 | A1  | 11/2012 | Saveri, III et al. |
| 2016/0381768 | A1  | 12/2016 | Noesner |
| 2017/0093593 | A1* | 3/2017  | Yang ............... H04L 12/2816 |
| 2018/0035517 | A1* | 2/2018  | Den Boer ......... H05B 37/0272 |
| 2018/0092186 | A1  | 3/2018  | Stuby, Jr. |
| 2018/0190117 | A1* | 7/2018  | Longardner ........ G08G 1/017 |

FOREIGN PATENT DOCUMENTS

| EP | 3 182 808 A1   | 6/2017 |
| WO | 2015/079350 A1 | 6/2015 |

OTHER PUBLICATIONS

International Search Report, International Application No. PCT/IB2019/053815, International Filing Date, May 9, 2019.

* cited by examiner

*Primary Examiner* — Jany Richardson

(57) ABSTRACT

A control system is provided including a sensor element mounted to a light fixture having a photocontrol component for sensing an ambient light and a sensor element communication module for contactless communication of sensor data and identifying data relating to an identifying characteristic of the sensor element to a light fixture communication module of the light fixture. The light fixture communication module receives the sensor data and the identifying data. A verification module receives the identifying data to verify compatibility of the sensor element with a light fixture control circuit having a light control module receiving the sensor data for operable control of a lighting element of the light fixture based on the received sensor data.

20 Claims, 3 Drawing Sheets

LOCAL LUMINAIRE AREA CONTROL SYSTEM

CROSS REFERENCE TO RELATED APPLICATIONS

This application claims benefit to U.S. Provisional Application No. 62/670,089 filed May 11, 2018, titled "LOCAL LUMINAIRE AREA CONTROL SYSTEM", the subject matter of which is herein incorporated by reference in its entirety.

BACKGROUND OF THE INVENTION

The subject matter herein relates generally to a local luminaire area control system for outdoor lighting control.

On outdoor lighting, notably street lights and parking lot lights, photocontrol components and the corresponding mating receptacles are typically used to turn the lights on and off based upon the ambient light from the sun. Some light fixtures support dimming to variably control the light fixture based on the ambient light levels, time of day. There is a trend to provide programmable functions to the light fixtures based on sensors and programmable controls other than ambient light, such as, detected nearby pedestrian motion. To accommodate these functions, the lighting control receptacles provide additional signaling contacts at the interface between the photocontrol component and the receptacle component mounted to the housing of the light fixture. However, the area available on the components for such signaling contacts is small due to standard arrangement of contacts supporting twist-lock interconnection. Additionally, alignment of the contacts is difficult due to the twist-lock arrangement between the sensor component and the receptacle component. Wired connections are impractical because of the twist-lock arrangement between the sensor component and the receptacle component. Additionally, environmental sealing complicates the design. Communication between the various components may be difficult due to the different communication protocols that may be used by different manufacturers. Furthermore, different products from different manufacturers may have different functionality making the system unusable when mixing products from different manufacturers.

A need remains for a sensor element that allows data communication between the sensor and the control circuit of the light fixture.

BRIEF DESCRIPTION OF THE INVENTION

In one embodiment, a local luminaire area (LLA) control system is provided including a sensor element having a base configured to be mounted to a light fixture. The sensor element has a sensor for sensing an environmental characteristic exterior of the sensor element and generating sensor data relating to the environmental characteristic. The sensor element has a sensor element communication module configured for contactless communication of the sensor data and configured for contactless communication of identifying data relating to an identifying characteristic of the sensor element. The LLA control system includes a light fixture control circuit having a light fixture communication module configured for contactless communication with the sensor element communication module. The light fixture communication module receives the sensor data and receives the identifying data from the sensor element communication module. The light fixture control circuit has a verification module that receives the identifying data from the light fixture communication module to verify compatibility of the sensor element and the light fixture control circuit. The light fixture control circuit receives the sensor data from the light fixture communication module.

In another embodiment, an LLA control system is provided including a sensor element having a base configured to be mounted to a light fixture. The sensor element has a sensor component for sensing an environmental characteristic exterior of the sensor element and generating sensor data relating to the sensed environmental characteristic. The sensor element has a sensor element communication module configured for contactless communication of the sensor data and configured for contactless communication of identifying data relating to an identifying characteristic of the sensor element. The LLA control system includes a light fixture control circuit having a light fixture communication module configured for contactless communication with the sensor element communication module. The light fixture communication module receives the sensor data and receives the identifying data. The light fixture communication module is configured for contactless communication with a communication device remote from the light fixture. The light fixture control circuit has a verification module receiving the identifying data to verify compatibility of the sensor element and the light fixture control circuit.

In a further embodiment, an LLA control system is provided including a primary sensor element, a secondary sensor element, and a light fixture control circuit. The primary sensor element has a base configured to be mounted to a light fixture and having a photocontrol component for sensing an ambient light exterior of the sensor element and generating primary sensor data relating to the sensed ambient light and having a primary sensor element communication module configured for contactless communication of the primary sensor data and configured for contactless communication of identifying data relating to an identifying characteristic of the primary sensor element. The secondary sensor element has a base configured to be mounted to the light fixture, and has a sensor component for sensing an environmental characteristic other than ambient light exterior of the secondary sensor element and generating secondary sensor data relating to the sensed environmental characteristic, and has a secondary sensor element communication module configured for contactless communication of the secondary sensor data and configured for contactless communication of identifying data relating to an identifying characteristic of the secondary sensor element. The light fixture control circuit has a light fixture communication module configured for contactless communication with the primary sensor element communication module and the secondary sensor element communication module. The light fixture communication module receives the primary sensor data and receives the secondary sensor data. The light fixture control circuit having a verification module receiving the identifying data from the light fixture communication module to verify compatibility of the primary sensor element and the secondary sensor element with the light fixture control circuit

DETAILED DESCRIPTION OF THE INVENTION

Figure 1:
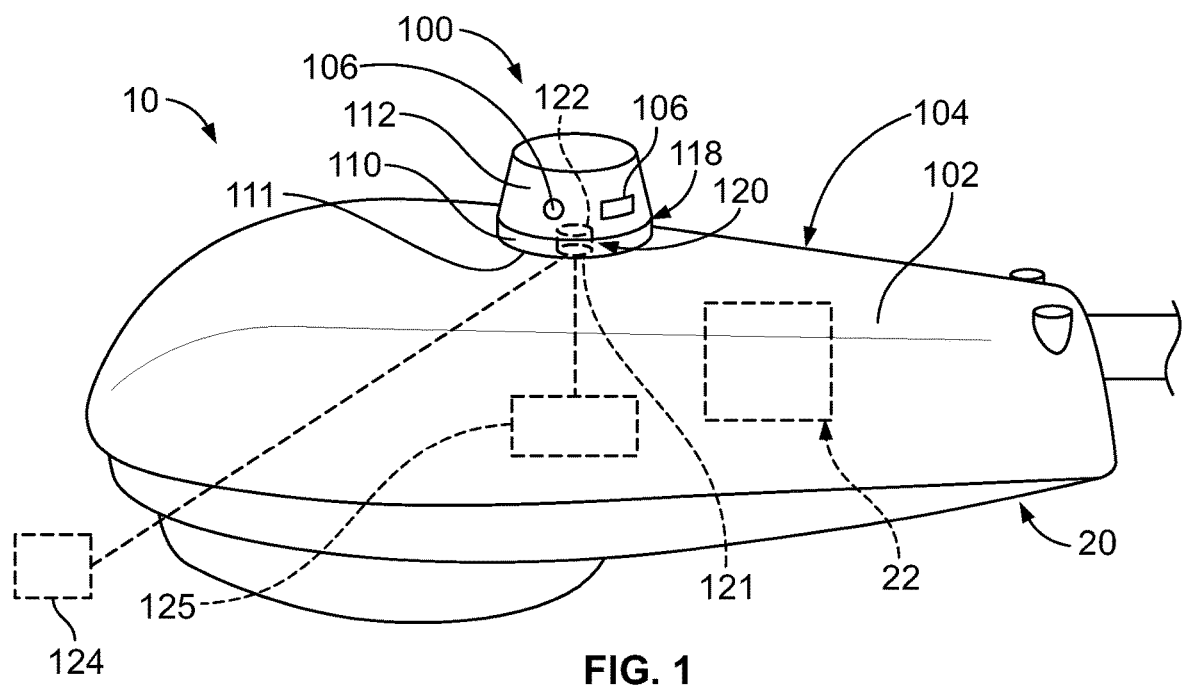
FIG. 1 illustrates a local luminaire area (LLA) control system having a sensor element formed in accordance with an exemplary embodiment.

FIG. 1 illustrates a local luminaire area (LLA) control system 10 formed in accordance with an exemplary embodiment. The LLA control system 10 includes one or more sensor elements 100 operably coupled to a light fixture control circuit 20 for controlling a light fixture 104. The sensor element 100 is mounted to a housing 102 of the light fixture 104, such as a roadway light, a parking lot light, a street light, and the like, or to another component, such as the pole or other structure supporting the light fixture 104, or to another component unassociated with the light fixture, such as a parking meter, a telephone pole or another structure. The sensor element 100 is used to deploy sensing, actuation and/or control solutions for public utility, municipality and/or commercial management systems, such as a Smart City or a Smart Grid infrastructure. The sensor element 100 provide sensing, actuation and/or control of the light fixture 104 for energy management and/or security functions. In an exemplary embodiment, the light fixture 104 and/or the sensor element 100 may be networked within the LLA control system 10 by means of wireless communication with each other and/or with one or more remote monitoring devices and/or with a central monitoring system (e.g., using a star network, point-to-point network, mesh network, bus network, and the like).

The sensor element 100 holds one or more sensors 106 that is/are used to control the light fixture 104, such as for turning the light fixture 104 on or off depending upon light levels, for dimming control of the light fixture 104, or for controlling other functions. For example, the sensor 106 may be a photocontrol component configured to monitor and sense ambient light levels around the sensor element 100, such as a photocell or light sensor used to detect ambient light from the sun. The sensor element 100 may include other types of sensors in addition to the photocontrol component or in lieu of the photocontrol component, such as object identification sensors, proximity sensors, occupancy sensors, motion sensors, timing sensors, pollution sensors, noise sensors, such as to monitor for a gun shot, weather sensors, such as for measuring barometric pressure, humidity, temperature, and the like, or other types of sensors. The sensors 106 may be used for other functions other than controlling the light fixture 104, such as remote monitoring of the environmental surroundings of the housing 102, such as for parking monitoring, for street flow activity monitoring, or other functions. Control of the light fixture 104 need not be directly implemented by the sensors 106, but may be based on processing in the control circuit from inputs from the sensors 106 or from other components.

The sensor element 100 includes a receptacle connector 110 having a base 111 that forms the bottom of the sensor element 100. The base 111 of the receptacle connector 110 may be directly mounted to the housing 102 of the light fixture 104 or may be mounted to another component on the housing 102. In various embodiments, the sensor element 100 includes a sensor connector 112 coupled to the receptacle connector 110. In other various embodiments, the receptacle connector 110 and the sensor connector 112 may be integrated into a single component. The sensor connector 112 houses or surrounds the sensor 106, such as to provide environmental protection for the sensor 106. In an exemplary embodiment, the receptacle connector 110 is a twist-lock photocontrol receptacle connector 110 and the sensor connector 112 is a twist-lock photocontrol sensor connector 112, such as connectors 110, 112 being ANSI C136.x compliant. The connectors 110, 112 include power contacts 114, 116 (shown in FIG. 2), respectively, at a mating interface 118. For example, the power contacts 114, 116 may be twist-lock contacts. The power contacts 114, 116 may be high voltage power contacts. Other types of contacts may be provided at the mating interface for a direct, physical electrical connection across the mating interface 118 between the connectors 110, 112. The connectors 110, 112 may be other types of connectors other than twist-lock connectors. The connectors 110, 112 may include other types of power contacts 114, 116 other than twist-lock contacts or may not include any contacts but rather be contactless connections.

In an exemplary embodiment, the sensor element 100 includes a sensor element communication module 120 configured for contactless communication of data from the sensor element 100 to a light fixture communication module 125 of the light fixture control circuit 20 and/or to a remote communication device 124. In an exemplary embodiment, the sensor element communication module 120 is provided in the receptacle connector 110. In another exemplary embodiment, the sensor element communication module 120 is provided in the sensor connector 112. In other exemplary embodiments, both the receptacle connector 110 and the sensor connector 112 may include sensor element communication modules 120. For example, the receptacle connector 110 includes a receptacle connector communication device 121 defining the sensor element communication module 120 for contactless and wireless communication with the sensor connector 112 and/or for contactless and wireless communication with the light fixture communication module 125 and/or for contactless and wireless communication with the remote communication device 124. The sensor connector 112 includes a sensor connector communication device 122 defining the sensor element communication module 120 for contactless and wireless communication with the receptacle connector 110 and/or for contactless and wireless communication with the light fixture communication device 125 and/or for contactless and wireless communication with the remote communication device 124.

In the illustrated embodiment, the communication devices 121, 122 communicate wirelessly therebetween, such as through digital wireless signals, infrared signals, capacitive communication, inductive communication or by other types of contactless and wireless communication. Data may be transmitted from the sensor connector 112 to the receptacle connector 110, or vice versa, across the mating interface 118 without the need for contacts or wires between the communication devices 121, 122. The data may then be transmitted from the receptacle connector communication device 121 to the light fixture communication module 125 and/or the remote communication device 124. The receptacle connector communication device 121 may use a different communication protocol for communicating with the light fixture communication module 125 and/or the remote communication device 124 than the communication with the sensor connector communication device 122. For example, because of the proximity of the receptacle connector communication device 121 and the sensor connector communication device 122, the communication devices 121, 122 may communicate with a near field type of communication, but because of the distance between the receptacle connector communication device 121 and the light fixture communication module 125 and/or the remote communication device 124, the communication device 121 may communicate with a far field type of communication. The remote communication device 124 may be remote from the light fixture 104, such as on the ground or at a central communication location for control of the light fixture 104 and/or for monitoring the environment around the light fixture 104, such as pedestrian traffic, vehicle traffic, parking, or other environmental factors.

In an exemplary embodiment, the sensor element communication module 120 is configured for contactless communication of sensor data from the sensor 106. For example, the sensor data may relate to one or more of the environmental characteristics sensed by the sensor 106, such as the level of ambient light exterior of the sensor element 100 when the sensor is a photo control component or another type of environmental characteristic when another type of sensor component is used. Optionally, the sensor data may be processed by the sensor element 100 prior to being communicated by the sensor element communication module 120. Alternatively, the raw sensor data may be communicated by the sensor element communication module 120. The sensor data may be used by the LLA control system 10 to control operation of the light fixture 104, such as for turning on or off the light fixture 104 and/or dimming control of the light fixture 104. The sensor data may be used by the LLA control system 10 to control functions of other components remote from the light fixture 104, such as by communicating the sensor data back to a central system. The sensor data may be used for remote monitoring of the environmental surrounding the light fixture 104, such as for parking monitoring, for street flow activity monitoring, or other functions.

In an exemplary embodiment, the sensor element communication module 120 is configured for contactless communication of identifying data relating to an identifying characteristic of the sensor element 100. The identifying characteristic may be based on a sensing capability of the sensor element 100. For example, the sensing capability may relate to the type of sensor component or sensor components contained in the sensor element 100 to identify the type of sensing that the sensor element 100 is able to perform any type of environmental characteristic configured to be sensed by the sensor element 100. For example, the sensing capability may relate to ambient light level detection, occupancy or motion detection, whether detection, pollution detection, position detection or another type of sensing capability depending on the type of sensor contained within the sensor element 100. The identifying characteristic may relate to a brand manufacture for compliance verification within the LLA control system 10. The identifying characteristic may be a unique identifier of the sensor element 100, such as a product code, a barcode, a part number, an identification number, and the like. The identifying data is used for validation and verification that the sensor element 100 is able to be used within the LLA control system 10. The identifying data is used by the LLA control system 10 to develop the system architecture from a central system for controlling the Smart City system. The identifying data is used by the light fixture control system to control the sensor element 100. For example, control signals may be communicated back to the sensor element 100 to control one or more operations of the sensor element 100 based on the sensing capabilities of the sensor element 100. The sensor element 100 may be updated or upgraded based on the identifying data.

Figure 2:
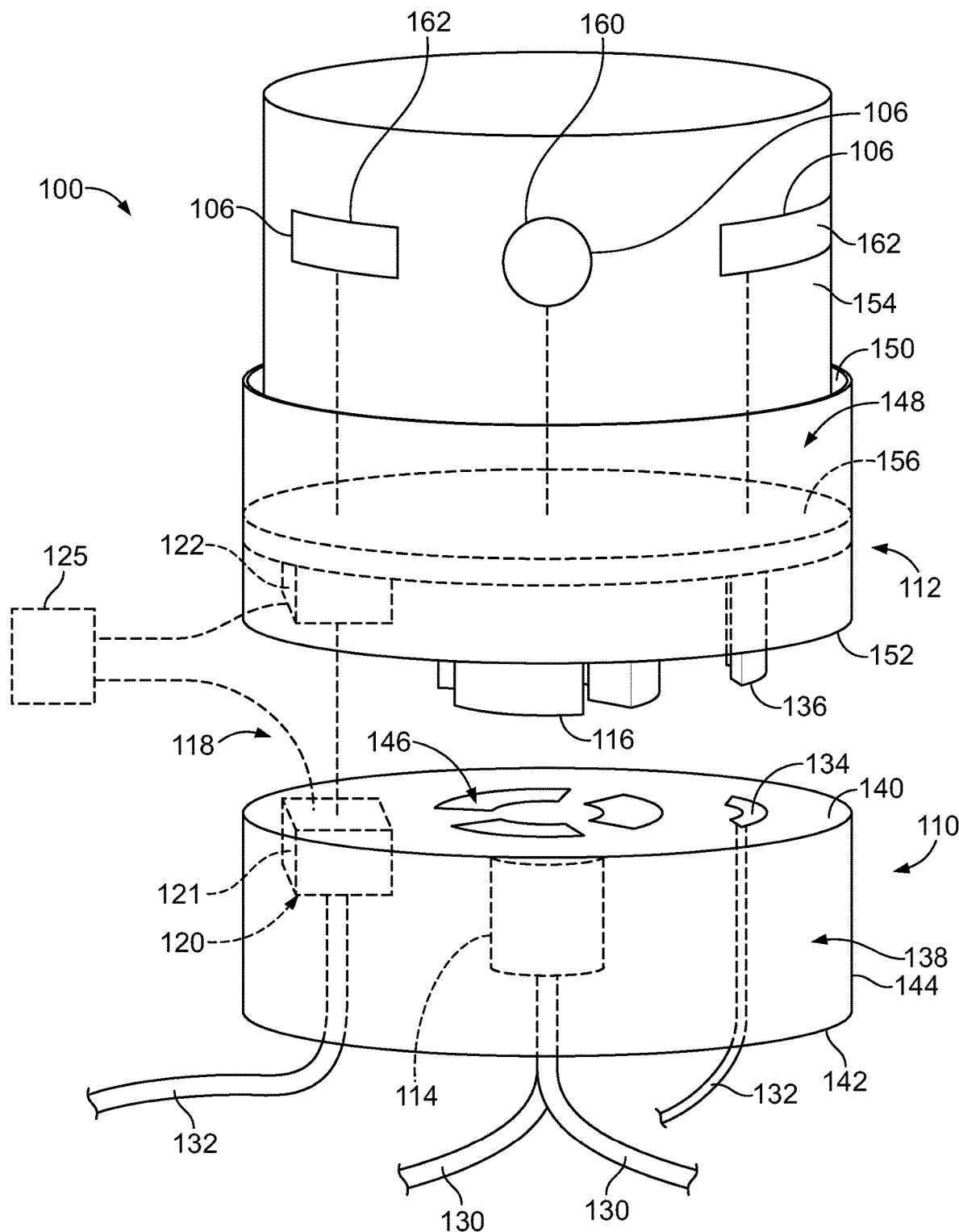
FIG. 2 is a schematic view of the sensor element formed in accordance with an exemplary embodiment.

FIG. 2 is a schematic view of the sensor element 100 formed in accordance with an exemplary embodiment showing the sensor connector 112 poised for mating with the receptacle connector 110. The connectors 110, 112 hold the power contacts 114, 116 and the communication devices 121 and/or 122 defining the sensor element communication module 120. Optionally, a seal (not shown) may be provided between the receptacle connector 110 and the sensor connector 112 to seal the sensor element 100 from environmental containments such as water, debris, and the like.

The sensor element 100 may include power wires 130 extending from the receptacle connector 110. The power wires 130 are terminated to corresponding power contacts 114. The power wires 130 may be power in or power out wires bringing power to the sensor element 100 from a power source or bringing power from the power contacts 114 to another component, such as the light or a driver board for the light of the light fixture 104. In other various embodiments, the sensor element 100 does not include the power wires 130 extending to/from the receptacle connector 110, but rather the power wires 130 may extend to other components in the light fixture 104.

The sensor element 100 may additionally or alternatively include signal wires 132 extending from the receptacle connector 110. The signal wires 132 may be electrically connected to the receptacle connector communication device 121. The signal wires 132 may be electrically connected to other components, such as signal contacts 136 of the receptacle connector 110. The signal wires 132 may transmit data to or from the receptacle connector communication device 121 for data communication with the sensor connector 112. The signal wires 132 may be electrically connected to one or more other components, such as a control module for controlling the operation of the light fixture 104 or other functions.

Optionally, as in the illustrated embodiment, the receptacle connector 110 may include signal contacts 134 at the mating interface 118 for electrical connection to corresponding signal contacts 136 of the sensor connector 112. The signal contacts 134, 136 are directly mated together at the mating interface 118. The signal wires 132 are terminated to corresponding signal contacts 134. The signal contacts 134 transmit different data signals than the communication devices 121, 122. Providing the contactless, wireless data link between the connectors 110, 112 using the communication devices 121, 122 allows additional data to be transmitted across the mating interface 118. In various embodiments, such as when the signal contacts 134, 136 are not provided, the wireless data link provided by the contactless connection between the connectors 110, 112 using the communication devices 121, 122 provides the only data link between the connectors 110, 112. For example, all data and/or control signals from the sensor connector 112 may be communicated by the communication devices 121, 122 rather than by using dedicated signal contacts, such as the signal contacts 134, 136.

The receptacle connector 110 includes a receptacle connector housing 138 extending between a top 140 and a bottom 142 opposite the top 140. The bottom 142 defines the base 111 and is configured to be secured to the fixture housing 102 or another component. The receptacle connector 110 includes a side wall 144 between the top 140 and the bottom 142. The housing 138 holds the power contacts 114, signal contacts 134 and the communication device 121. The communication device 121 may be defined by or on a circuit board. Optionally, such components may be entirely contained within the housing 138 and protected from the environment by the housing 138. For example, the power contacts 114 may be held in contact channels 146 within the housing 138. Optionally, the contact channels 146 are curved slots or openings in the housing 138 extending between the top 140 and the bottom 142. In an exemplary embodiment, the receptacle connector 110 is cylindrical shaped, such as to allow easy rotation of the sensor connector 112 relative to the receptacle connector 110. However, the receptacle connector 110 may have other shapes and alternative embodiments.

In an exemplary embodiment, the receptacle connector 110 includes at least one securing feature used to secure the sensor connector 112 relative to the receptacle connector 110. For example, the receptacle connector 110 may include a clip or a flange to secure the sensor connector 112 to the receptacle connector 110. The securing feature may allow rotation of the sensor connector 112 relative to the receptacle connector 110 when engaged. Other fastening methods that secure sensor connector 112 to the receptacle connector 110 may be employed, which may allow rotation of sensor connector 112 relative to receptacle connector 110. In other various embodiments, the interaction between the contacts 114, 116 is used to secure the sensor connector 112 to the receptacle connector 110.

The sensor connector 112 includes a housing 148 extending between a top 150 and a bottom 152 opposite the top 150. The bottom 152 may define the mating interface and is configured to be secured to the receptacle connector 110. In other embodiments, sides of the housing 148 or other securing features may be secured to the receptacle connector 110. In an exemplary embodiment, the sensor connector 112 includes a sensor lid 154 at the top 150 of the housing 148. The sensor lid 154 may be rotatably coupled to the housing 148, such as to allow positioning of the photocell relative to the light fixture 104 (e.g., to direct the photocell in a north direction to receive diffuse ambient light). In other various embodiments, the photocell may be provided at the top 150 such that rotation of the sensor lid 154 is unnecessary. In an exemplary embodiment, the receptacle connector 110 is cylindrical shaped, such as to allow easy rotation of the sensor connector 112 relative to the receptacle connector 110, such as during mating. However, the receptacle connector 110 may have other shapes and alternative embodiments.

The housing 148 holds the power contacts 116, the signal contacts 136 and the communication device 122. The housing 148 may hold the sensor(s) 106. In an exemplary embodiment, the housing 148 holds a circuit board 156 and various components are mounted to the circuit board 156. For example, the contacts 116, signal contacts 136, communication device 122 and/or the sensors 106 may be mounted to the circuit board 156. The contacts 116 and the signal contacts 136 may extend from the bottom 152 for mating with the contacts 114 and the signal contacts 134, respectively, of the receptacle connector 110 and may be arranged generally around a central axis, however the contacts 114 and/or 134 may be at different locations in alternative embodiments. Optionally, the contacts 116 may be curved and fit in the curved contact channels 146 in the receptacle connector 110 to mate with corresponding curved power contacts 114. In an exemplary embodiment, the sensor connector 112 may be twisted or rotated to lock the contacts 116 in the receptacle connector 110, such as in electrical contact with the contacts 114. For example, the contacts 116 may be twist-lock contacts that are initially loaded into the contact channels 146 in a vertical direction and the sensor connector 112 is then rotated, such as approximately 35 degrees, to lock the contacts 116 in the connector 110. Other types of mating arrangements between the contacts 116 and the connector 110 are possible in alternative embodiments.

In an exemplary embodiment, the sensor connector 112 includes different types of sensors 106 for sensing different events. For example, the sensor connector 112 includes a photocell 160. The photocell 160 may be a primary sensor 106; however, the sensor connector 112 may include one or more secondary sensors of a different type than the photocell 160 having different sensing capabilities than the photocell 160. The photocell 160 is used for sensing ambient light and is used to control operation of the light fixture 104, such as for turning the light fixture 104 on or off depending upon light levels or for dimming control of the light fixture 104. Optionally, the photocell 160 may be mounted to the circuit board 156. Alternatively, the photocell 160 may be mounted in the sensor lid 154 and aim-able by rotating the sensor lid 154 relative to the housing 148. In other various embodiments, the photocell 160 may be mounted to the sensor lid 154 and connected to the circuit board 156 by one or more wires or contacts. The contacts 114 and photocell 160 may be electrically connected via the circuit board 156. In other alternative embodiments, the contacts 114 may be connected to the photocell 160 via wires. The circuit board 156 may include additional componentry for signal conditioning. For example, the circuit board 156 may have control circuitry for controlling operation of the light fixture 104, such as including a daylight or nighttime control circuit, a timer circuit, a dimming circuit, and the like. Data from the photocell 160 may be transmitted through the signal contacts 134, 136 across the mating interface 118. Alternatively, data from the photocell 160 may be transmitted through the contactless, wireless communication devices 121, 122 across the mating interface 118 for control of the light fixture 104.

In an exemplary embodiment, the sensor connector 112 includes one or more environmental sensors 162 for sensing an environmental characteristic other than ambient light exterior of the sensor connector 112 in the environment exterior of the sensor connector 112. For example, the sensor 162 may be a motion sensor or an object sensor configured to sense movement or presence of an object, such as a person or vehicle in a particular area. The sensor 162 may be used for parking monitoring, for street flow activity monitoring, for pedestrian monitoring, or other functions. The sensor 162 may be a position sensor, such as a GPS sensor for determining a position of the light fixture 104. The sensor 162 may be a weather detection sensor configured to detect one or more weather-related characteristics, such as barometric pressure, humidity, temperature, and the like. The sensor 162 may be a pollution sensor configured to detect particulates of one or more types of matter. The sensor 162 may be mounted to the circuit board 156. In an exemplary embodiment, the sensor 162 is electrically connected to the sensor connector communication device 122. The communication device 122 receives signals from the environmental sensor 162 and wirelessly communicates sensor data based on the received signals from the environmental sensor 162 with the receptacle connector communication device 121 across the mating interface 118. In various other embodiments, data from the environmental sensor(s) 162 may be transmitted through the signal contacts 134, 136 across the mating interface 118.

In an exemplary embodiment, the communication devices 121, 122 are transceivers configured for two-way communication. For example, data relating to signals from the photocontrol components 160, 162 may be transmitted from the sensor connector communication device 122 and received by the receptacle connector communication device 121. The communication devices 121, 122 may transmit data relating to light levels, dimming control of the light fixture 104, or other environmental information about the environment around the light fixture 104. Additionally, the communication device 122 may transmit data, such as identifying metadata about the sensor connector 112, to the receptacle connector communication device 121. The identifying metadata may be a serial number, location coordinates or other metadata associated with the receptacle connector 110 and/or the light fixture 104. The metadata may be independent of the sensor data. The metadata may be used to control operation of the sensors 106, such as timing or control of operation.

In other various embodiments, rather than providing two-way communication, the communication devices 121, 122 may be operated to transmit data only from the sensor connector communication device 122 to the receptacle connector communication device 121. For example, the communication device 121 may be a receiver and the communication device 122 may be a transmitter. In other various embodiments, the communication devices 121, 122 may be operated to transmit data only from the receptacle connector communication device 121 to the sensor connector communication device 122. For example, the communication device 122 may be a receiver and the communication device 121 may be a transmitter.

In an exemplary embodiment, the communication devices 121, 122 communicate wirelessly therebetween through digital wireless signals or other types of wireless signals. For example, the communication devices 121, 122 may communicate using RF wireless communication, near-field communication (NFC), RFID, Bluetooth low energy (BLE) communication, ZigBee communication, RuBee communication, magnetic communication and the like. The communication devices 121, 122 may communicate using capacitive coupling, inductive coupling or electromagnetic fields. The communication devices 121, 122 may be closely aligned for efficient coupling. The communication devices 121, 122 may communicate using line-of-sight wireless communication, such as optical communication including infrared communication or communication using other visible or invisible light spectrums.

In an exemplary embodiment, multiple sensor connector communication devices 122 may communicate with one or more receptacle connector communication devices 121. Multiple receptacle connector communication devices 121 may communicate with one or more sensor connector communication devices 122. Optionally, any of the communication devices 121, 122 may communicate with another communication device, such as the remote communication device 124 and/or the light fixture communication module 125. The remote communication device 124 may be part of a hand-held device on the ground held by an operator. The remote communication device 124 may be a central station monitoring data from multiple light fixtures. The remote communication device 124 may transmit data to the communication device 122 (or the communication device 121) for remote control of the light fixture 104.

In an exemplary embodiment, the smart sensor connector 112 having the enhanced sensor capability is backwards compatible with conventional 3-contact ANSI C136.x receptacles and with 4-7 contact ANSI receptacles. Optionally, providing the communication devices 121, 122 in the connectors 110, 112 may replace some or all of the 1-4 low voltage signal contacts of conventional ANSI receptacles; however, the communication devices 121, 122 in the connectors 110, 112 may be used in addition to the low voltage signal contacts of conventional ANSI receptacles to enhance the amount or type of data being transmitted between the connectors 110, 112. The communication devices 121, 122 may be designed and positioned in the connectors 110, 112 to be aligned when the twist-lock connectors 110, 112 are mated; however, in some embodiments, the communication devices 121, 122 do not need to be aligned and can operate at any location within the connectors 110, 112. The communication devices 121, 122 may be designed to communicate with digital multiplexing capabilities or digital packet protocols for enhanced data transfer. The signals transmitted to-from the communication devices 121, 122 may be converted to DALI compliant levels or may be converted to 0-10V (standard) compliant levels. The connections to the communication devices, such as to the sensors 160, 162 or to the wires 132 may be through wires, terminals, connectors, printed circuit board connections, and the like.

Figure 3:
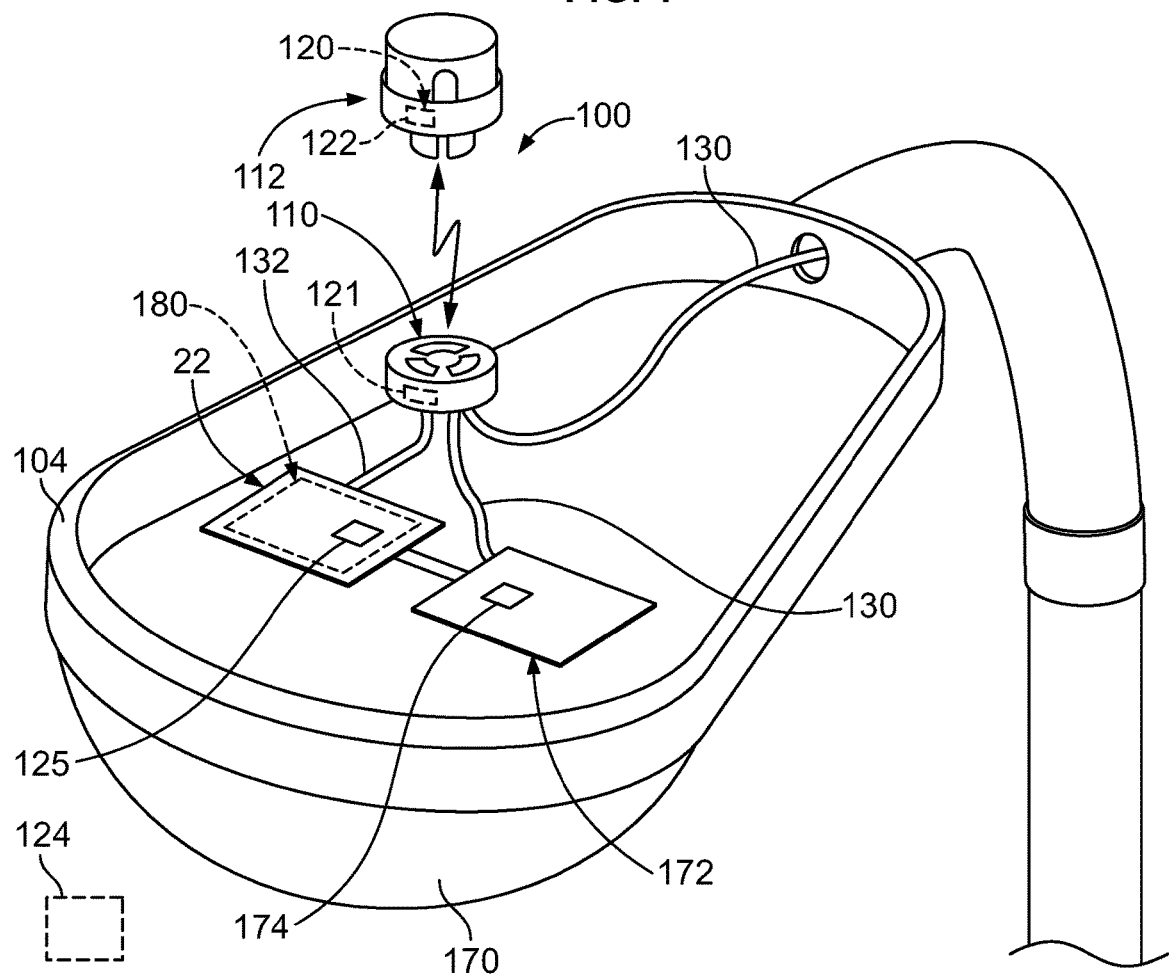
FIG. 3 is a schematic view of the sensor element within a light fixture.

FIG. 3 is a schematic view of the sensor element 100 and the light fixture control circuit 20 within the light fixture 104. The light fixture 104 includes a lighting element 170. The lighting element 170 is powered by the power wires 130. For example, the power wires 130 are connected to a light control module 22 of the light fixture control circuit 20. The power wires 130 extend to/from the receptacle connector 110 and may be electrically connected to the contacts 114 (shown in FIG. 2). The light control module 22 includes circuitry for supplying power to the lighting element 170. For example, in various embodiments, the light control module 22 includes a power driver circuit board 172. The light control module 22 may include a switch 174 for switching the power on or off. Optionally, the light control module 22 may control dimming of the lighting element 170, such as by controlling the power to the lighting element 170.

In an exemplary embodiment, the light control module 22 includes a control circuit 180, such as on a main circuit board. The control circuit 180 controls operation of the light fixture 104. For example, the control circuit 180 may control operation of the switch 174. The control circuit 180 may be connected to the power driver circuit board 172 by wires. Alternatively, the control circuit 180 may be connected to the power driver circuit board 172 wirelessly. In other various embodiments, the control circuit 180 and the power driver circuit board 172 may be on the same circuit board and connected by traces.

In an exemplary embodiment, the control circuit 180 includes the light fixture communication module 125. The control circuit 180 receives inputs from the sensor element 100, such as from the sensor element communication module 120, and provides outputs, such as to the power driver circuit board 172. In various embodiments, the control circuit 180 is electrically connected to the signal wires 132, which are electrically connected to the receptacle connector communication device 121 and/or the signal contacts 134 (shown in FIG. 2). In other various embodiments, the control circuit 180 has contactless communication with the receptacle connector communication device 121 and/or the sensor connector communication device 122. As such, the control circuit 180 receives data from the center element 100. The data may be used to control operation of the light fixture 104. The data may be used to control other functions. The data may be further transmitted to another communication device, such as the remote communication device 124, such as for parking or traffic monitoring.

Figure 4:
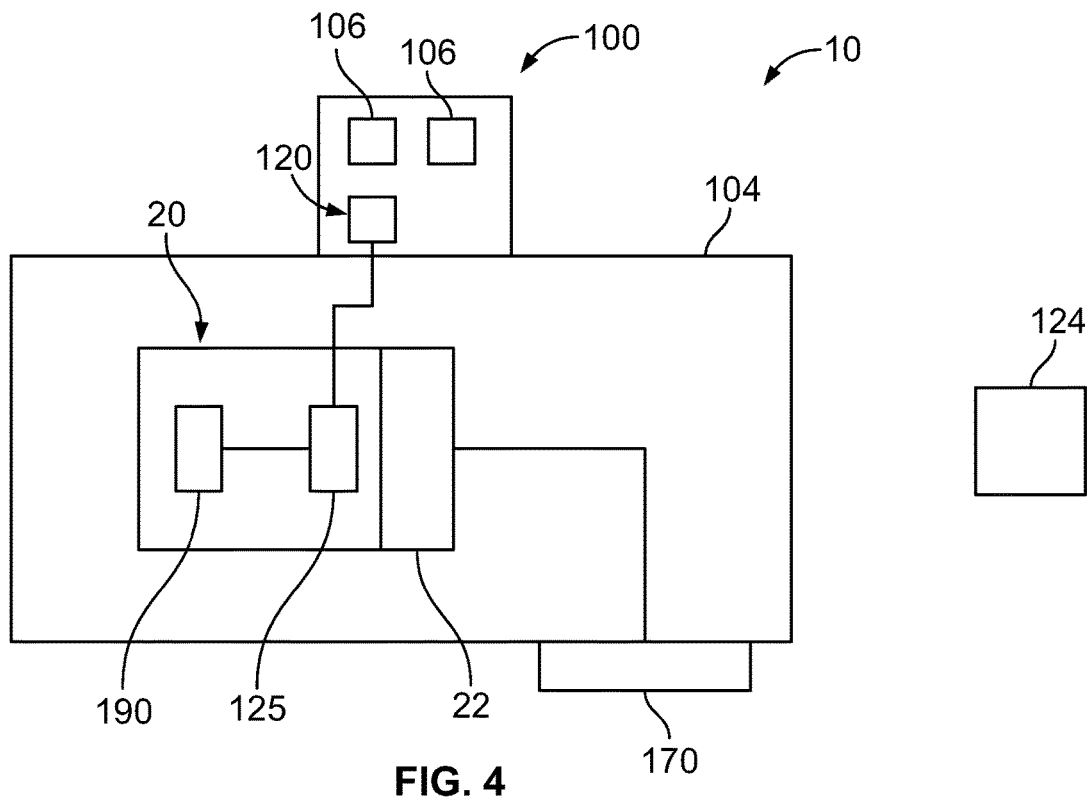
FIG. 4 is a schematic view of the LLA control system in accordance with an exemplary embodiment.

FIG. 4 is a schematic view of the LLA control system 10 in accordance with an exemplary embodiment. The control system 10 includes the sensor element 100 mounted to the light fixture 104. The sensor element 100 includes the sensor 106 for sensing an environmental characteristic exterior of the sensor element 100 and generating sensor data relating to the sensed environmental characteristic. In an exemplary embodiment, the sensor element 100 is a primary sensor element having a primary function of sensing ambient light exterior of the sensor element 100, wherein the sensor 106 is a photocontrol component, such as a photocell. The control of the light fixture 100 is based on the sensor data from the primary sensor element 100. Optionally, the primary sensor element 100 may include other types of sensors for sensing an environmental characteristic other than ambient light. In other embodiments, the control system 10 may include a secondary sensor element discrete from the primary sensor element having one or more sensors for sensing environmental characteristics other than ambient light.

The sensor element 100 includes the sensor element communication module 120 configured for contactless communication of the sensor data with the light fixture communication module 125 in the light fixture 104. In an exemplary embodiment, the sensor element communication module 120 is configured for contactless communication of identifying data relating to an identifying characteristic of the sensor element 100 in addition to the sensor data. The light fixture communication module 125 may transmit data back to the sensor element communication module 120 in various embodiments. For example, the light fixture communication module 125 may transmit control data to the sensor element communication module 120 for controlling operation of the sensor element 100. The light fixture communication module 125 may wirelessly communicate with other components, such as the remote communication device 124. Additionally or alternatively, the sensor element communication module 120 may communicate directly with the remote communication device 124.

In an exemplary embodiment, the communication modules 120, 125 communicate wirelessly therebetween through digital wireless signals or other types of wireless signals. For example, the communication modules 120, 125 may communicate using RF wireless communication, near-field communication (NFC), RFID, Bluetooth low energy (BLE) communication, ZigBee communication, RuBee communication, magnetic communication and the like. The communication modules 120, 125 may communicate using capacitive coupling, inductive coupling or electromagnetic fields. The communication modules 120, 125 may be closely aligned for efficient coupling. The communication modules 120, 125 may communicate using line-of-sight wireless communication, such as optical communication including infrared communication or communication using other visible or invisible light spectrums. In an exemplary embodiment, the communication modules 120, 125 may communicate wirelessly with the remote communication device 124 through digital wireless signals or other types of wireless signals. For example, the communication modules 120, 125 may communicate with the remote communication device 124 using RF wireless communication, near-field communication (NFC), cellular communication, Bluetooth low energy (BLE) communication, and the like.

The light fixture control circuit 20 is used for controlling various functions of the light fixture 104 and the control system 10. For example, the light control module 22 of the light fixture control circuit 20 is used for controlling the lighting element 170 of the light fixture 104, such as ON/OFF, dimming or other functions. The light control module 22 switches and controls power to the lighting element 170. The light fixture communication module 125 of the light fixture control circuit 20 is used for communication with the sensor element 100 and/or with the remote communication module 124. In an exemplary embodiment, the light fixture control circuit 20 includes a verification module 190 used to verify compatibility of the sensor element 100 and the light fixture control circuit 20. For example, the verification module 190 receives the identifying data from the sensor element 100 received through the light fixture communication module 125. The verification module 190 verifies that the sensor element 100 is of the type configured for use with the light fixture control circuit 20 and/or verifies that the sensor data from the sensor element 100 is usable by the light fixture control circuit 20 and/or verifies that the sensor element 100 is up to date and/or calibrated for use with the light fixture control circuit 20 and/or may initiate updating of the sensor element 100 and/or calibration of the sensor element 100 based on the identifying data. The verification module 190 may host or prescribe a list or database of features and/or functions of the sensor element 100.

In an exemplary embodiment, the light fixture control circuit 20 includes a circuit board having one or more circuits for controlling the operation of the LLA control system 10. The light fixture control circuit 20 may include one or more processors. Optionally, the light fixture control circuit 20 may include a central processing unit (CPU), one or more microprocessors, a graphics processing unit (GPU), or any other electronic component capable of processing inputted data according to specific logical instructions. Optionally, the light fixture control circuit 20 may include and/or represent one or more hardware circuits or circuitry that include, are connected with, or that both include and are connected with one or more processors, controllers, and/or other hardware logic-based devices. Additionally or alternatively, the light fixture control circuit 20 may execute instructions stored on a tangible and non-transitory computer readable medium (e.g., the memory).

As used herein, the term "computer," "control circuit," "circuit," or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "control circuit".

The circuit or module executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, control circuit, module and/or circuit to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a control unit, circuit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 5:
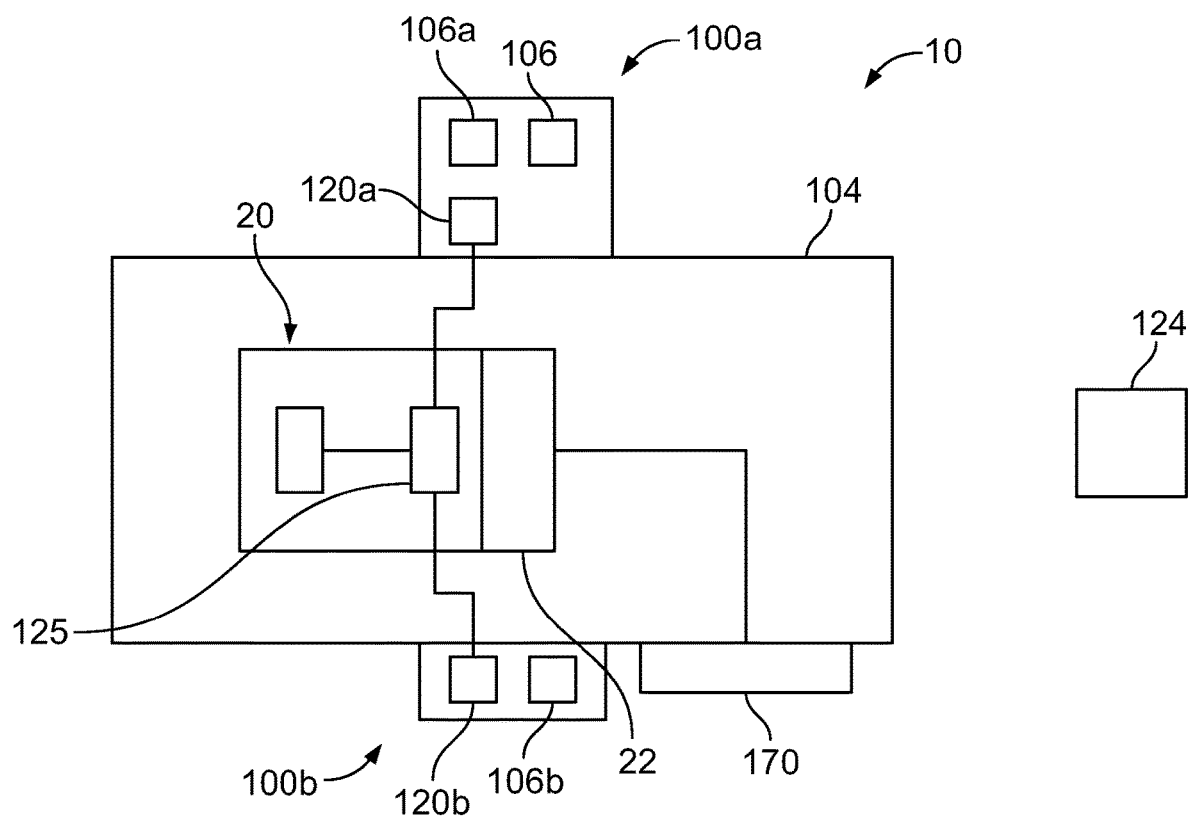
FIG. 5 is a schematic view of the LLA control system in accordance with an exemplary embodiment.

FIG. 5 is a schematic view of the LLA control system 10 in accordance with an exemplary embodiment. The control system 10 includes the primary sensor element 100a mounted to the light fixture 104 and a secondary sensor element 100b. The primary sensor element 100a includes the photocontrol component 106a for sensing ambient light exterior of the sensor element 100 and generating sensor data relating to the sensed ambient light condition. The secondary sensor element 100b has one or more secondary sensors 106b for sensing environmental characteristics other than ambient light. In the illustrated embodiment, the primary sensor element 100a is mounted to one side of light fixture 104 of the secondary sensor element 100b is mounted to a different side of the light fixture 104; however, the sensor elements 100a, 100b may be mounted at other locations in alternative embodiments, including adjacent to each other and/or stacked on each other.

For example, the secondary sensor 106b may be a motion sensor or an object sensor configured to sense movement or presence of an object, such as a person or vehicle in a particular area. The secondary sensor 106b may be used for parking monitoring, for street flow activity monitoring, for pedestrian monitoring, or other functions. The secondary sensor 106b may be a position sensor, such as a GPS sensor for determining a position of the light fixture 104. The secondary sensor 106b may be a weather detection sensor configured to detect one or more weather-related characteristics, such as barometric pressure, humidity, temperature, and the like. The secondary sensor 106b may be a pollution sensor configured to detect particulates of one or more types of matter.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A local luminaire area (LLA) control system comprising:
a sensor element having a base configured to be mounted to a light fixture, the sensor element having a sensor for sensing an environmental characteristic exterior of the sensor element and generating sensor data relating to the sensed environmental characteristic, the sensor element having a sensor element communication module configured for contactless communication of the sensor data and configured for contactless communication of identifying data relating to an identifying characteristic of the sensor element, wherein the identifying characteristic is a unique identifier of the sensor element; and
a light fixture control circuit configured to be arranged in the light fixture, the light fixture control circuit having a light fixture communication module configured for contactless communication with the sensor element communication module, the light fixture communication module receiving the sensor data and receiving the identifying data from the sensor element communication module, the light fixture control circuit having a verification module receiving the identifying data from the light fixture communication module to verify compatibility of the sensor element and the light fixture control circuit, the light fixture control circuit receiving the sensor data from the light fixture communication module.

2. The LLA control system of claim 1, wherein the identifying characteristic is based on a sensing capability of the sensor element.

3. The LLA control system of claim 1, wherein the unique identifier of the sensor element is at least one of a product code, a barcode, a part number, and an identification number.

4. The LLA control system of claim 1, wherein the identifying characteristic is based on a type of sensing and a type of environmental characteristic configured to be sensed by the sensor element.

5. The LLA control system of claim 1, wherein the sensor is a photocell for sensing ambient light, the sensor element having a secondary sensor component for sensing an environmental characteristic other than ambient light.

6. The LLA control system of claim 1, wherein the light fixture communication module is configured for contactless communication with a remote communication device remote from the light fixture.

7. The LLA control system of claim 1, wherein the light fixture communication module transmits control data to the sensor element communication module for controlling operation of the sensor element.

8. The LLA control system of claim 1, wherein the light fixture communication module transmits the sensor data and the identifying data to a remote communication device remote from the light fixture.

9. The LLA control system of claim 1, wherein the light fixture control circuit includes a light control module, the light control module being operably coupled to a lighting element of the light fixture for controlling operation of the lighting element based on the received sensor data.

10. The LLA control system of claim 1, further comprising a secondary sensor element having a base configured to be mounted to the light fixture, the secondary sensor element having a sensor component for sensing an environmental characteristic other than ambient light exterior of the secondary sensor element and generating secondary sensor data relating to the sensed environmental characteristic, the secondary sensor element having a secondary sensor element communication module configured for contactless communication of the secondary sensor data with the light fixture communication module.

11. The LLA control system of claim 1, wherein the sensor element includes a receptacle connector housing including contact channels holding power contacts receiving power for powering a lighting element of the light fixture, the sensor element communication module being contained within the receptacle connector housing.

12. The LLA control system of claim 1, wherein the sensor element communication module includes a transceiver.

13. The LLA control system of claim 1, wherein the sensor element communication module is configured to be one of capacitively coupled or inductively coupled to the light fixture communication module.

14. The LLA control system of claim 1, wherein the sensor element communication module is configured to wirelessly communicate with the light fixture communication module by infrared signals.

15. The sensor element of claim 1, wherein the sensor element communication module is configured to wirelessly communicate with the light fixture communication module by digital communication.

16. A local luminaire area (LLA) control system comprising:
a primary sensor element having a base configured to be mounted to a light fixture, the primary sensor element having a photocontrol component for sensing an ambient light exterior of the sensor element and generating primary sensor data relating to the sensed ambient light, the primary sensor element having a primary sensor element communication module configured for contactless communication of the primary sensor data and configured for contactless communication of identifying data relating to an identifying characteristic of the primary sensor element;
a secondary sensor element having a base configured to be mounted to the light fixture, the secondary sensor element having a sensor component for sensing an environmental characteristic other than ambient light exterior of the secondary sensor element and generating secondary sensor data relating to the sensed environmental characteristic, the secondary sensor element having a secondary sensor element communication module configured for contactless communication of the secondary sensor data and configured for contactless communication of identifying data relating to an identifying characteristic of the secondary sensor element; and
a light fixture control circuit configured to be arranged in the light fixture, the light fixture control circuit having a light fixture communication module configured for contactless communication with the primary sensor element communication module and the secondary sensor element communication module, the light fixture communication module receiving the primary sensor data and receiving the secondary sensor data, the light fixture control circuit having a verification module receiving the identifying data from the light fixture communication module to verify compatibility of the primary sensor element and the secondary sensor element with the light fixture control circuit.

17. The LLA control system of claim 16, wherein the identifying characteristic is a unique identifier of the sensor element.

18. The LLA control system of claim 16, wherein the identifying characteristic is based on a type of sensing and a type of environmental characteristic configured to be sensed by the sensor element.

19. The LLA control system of claim 16, wherein the light fixture communication module transmits control data to the sensor element communication module for controlling operation of the sensor element.

20. The LLA control system of claim 16, wherein the light fixture communication module transmits the sensor data and the identifying data to a remote communication device remote from the light fixture.

* * * * *